United States Patent [19]
Eckstein

[11] Patent Number: 4,602,978
[45] Date of Patent: Jul. 29, 1986

[54] APPARATUS FOR SEALING LAP JOINTS OF ROOFING SHEETS

[76] Inventor: Leonard E. Eckstein, R.R. #1, Sunman, Ind. 47041

[21] Appl. No.: 635,566

[22] Filed: Jul. 30, 1984

[51] Int. Cl.[4] .......................... B05C 1/02; B05C 1/06; B32B 35/00
[52] U.S. Cl. .................................. 156/564; 156/551; 156/575; 156/578; 156/579
[58] Field of Search ............... 156/546, 549, 550, 551, 156/574, 575, 578, 579

[56] References Cited

U.S. PATENT DOCUMENTS

| | | | |
|---|---|---|---|
| 3,007,838 | 11/1961 | Eigenmann | 156/575 |
| 3,016,040 | 1/1962 | Crookston, Jr. | 118/72 |
| 3,099,582 | 7/1963 | Ongstad et al. | 156/579 |
| 4,055,384 | 10/1977 | Palzer | 156/578 |
| 4,087,309 | 5/1978 | Lang | 156/578 |
| 4,204,904 | 5/1980 | Tabor | 156/574 |
| 4,239,581 | 12/1980 | Lang | 156/497 |
| 4,259,142 | 3/1981 | Kortepeter | 156/578 |
| 4,368,686 | 1/1983 | Dickson et al. | 156/575 |
| 4,440,588 | 4/1984 | Stevenson et al. | 156/578 |

Primary Examiner—Michael Wityshyn
Attorney, Agent, or Firm—Wood, Herron & Evans

[57] ABSTRACT

An apparatus for sealing the lap joint formed by the edge of an upper sheet of roofing material overlying the edge of a lower sheet comprises a frame, a handle assembly mounted to the frame, a drive assembly including an endless belt which contacts the roof and is wrapped around a pair of spaced rollers mounted for rotation to the frame, a solvent delivery assembly mounted to the frame for applying solvent material between the overlapping edges of the roofing sheets, and a plurality of spring-biased casters mounted to the frame and extending downwardly into contact with the endless belt. The spring-biased casters are adapted to urge the belt against the upper roofing sheet and into contact with the lower sheet, thereby permitting the solvent material to create a bond therebetween. The spring-biased casters are arranged in an array so that pressure is applied to the entire lower run of the belt which contacts the roof surface.

3 Claims, 4 Drawing Figures

APPARATUS FOR SEALING LAP JOINTS OF ROOFING SHEETS

BACKGROUND OF THE INVENTION

This invention relates generally to roofing apparatus, and, more particularly, to a motorized roofing apparatus adapted to apply a continuous, even coating of solvent material between the overlapping edges of sheets of roofing material and ensure that such edges are urged together to create a weather-tight seal therebetween.

A variety of new roofing materials have been developed in recent years which are intended for gently sloping or flat roofs commonly found in industrial or commercial buildings. Normally, roofing materials are commercially available in rolls and are applied to the roof by first rolling out one strip or sheet of roofing material and then a second sheet so that its edge overlaps the edge of the first sheet. The overlapped edges of the sheets are then sealed together to form a weather-tight lap joint.

In applying bituminous roofing materials, it is customary to spread liquid or molten tar between the edges of overlapping sheets to create a seal therebetween. This operation is usually done manually with one or more workmen lifting the edge of the overlapped sheet and another applying the molten tar with a brush. In some instances, a portable roofing apparatus may be used to apply the tar or adhesive. Known portable roofing apparatus for applying tar typically include a wedge-shaped applicator adapted to be inserted beneath the edge of an upper, overlapping sheet of roofing material. A nozzle is mounted to the applicator and connects to one end of a delivery line, which is connected at its other end to a container of tar or adhesive. Pressing a trigger forces the tar or adhesive from the container through the delivery line and to the nozzle in the wedge-shaped applicator where it is deposited beneath the edge of the overlapping roofing sheet. The apparatus is advanced along the roof by hand and the upper, overlapping sheet is pressed into engagement with the sheet beneath by stepping on it, or otherwise applying weight such as by placing a sandbag on the upper roofing sheet over the lap joint. See for example U.S. Pat. Nos. 3,099,582 and 3,016,040.

Heat-fusible roofing materials have been developed and used in recent years, and are generally made as a single-ply sheet or multi-ply sheets including a core of plastic and/or bitumen layers encased within polyethylene. The lap joints formed by roofing sheets made of this material are sealed or fused by first applying heat to both the overlying sheet and the one beneath, and then pressing the two sheets together. Several machines for applying the heat-fusible roofing material have been developed to avoid a time-consuming and costly manual application operation using hand held torches or burners to heat the roofing sheets. See for example U.S. Pat. Nos. 4,259,142; 4,087,309; 4,204,904; and 4,239,581. Each of these patented machines generally comprise a frame, a handle assembly mounted to the frame, one or more burners mounted to the frame for heating the overlapping edges of the roofing material, and a continuous roller or other element mounted to the trailing end of the frame for applying pressure to the overlapping edges after they are heated to help create a seal therebetween.

As an alternative to heat-fusible roofing materials, a single-ply thermoplastic roofing membrane has been developed which is sealed by spreading a solvent material between the overlapping edges of roofing sheets without the application of heat. This material provides high tensile strength, good puncture and tear resistance, minimum shrinkage and is typically lighter than traditional bituminous roofing materials and the heat-fusible multi-ply roofing material. While providing many operational advantages, single-ply thermoplastic roofing material is typically installed manually by lifting the overlapped edge of one sheet and then applying the solvent material with a brush to the edge of the sheet beneath. The lap joint formed by the overlapping sheets is sealed by the application of pressure to the upper or overlying sheet, allowing the solvent to chemically react with the sheet material and in effect fuse the overlapping edges of the upper and lower sheets together. Pressure is usually applied to the upper sheet by stepping on it or placing a sandbag or other weight on the upper sheet.

Creating a good seal at the lap joint formed by overlapping roofing sheets is critical to obtain a weather-tight roof. It has been found that one major cause of bad seals between roofing sheets is the presence of surface irregularities in the roof such as valleys, ridges and bumps. Particularly with the thin, flexible single-ply roofing sheets, of either the heat-fusible or solvent-fusible type, the lower sheet forming the lap joint tends to follow the contours or surface irregularities of the roof so as to present an upper surface having ridges, valleys and bumps for engagement with the overlapping upper sheet. Unless the upper sheet is forced into the ridges and valleys of the lower sheet, gaps are formed in the seal therebetween. These gaps prevent the solvent from creating a bond between the sheets, and the result is a seal which is not weather-tight.

Prior methods and apparatus for forcing or pressing the upper sheet against the lower sheet of a lap joint are unsatisfactory in the installation of either heat-fusible or solvent-fused single-ply roofing material. The application of solvent or adhesive to the roofing sheets by handbrush, or by hand-operated machines such as described above, require the workman to either step on the upper sheet or apply a weight such as a sandbag to effect a seal of the roofing sheets. These manual methods are labor intensive, time consuming and can leave gaps in the overlapping sheets. The manner in which the lap joint of heat-fusible roofing sheets is sealed by a machine such as described above, usually involves the application of pressure to the roofing sheets after they are heated by a single, cylindrical-shaped roller mounted at the trailing end of the machine. The roller is continuous and rigid from end to end. It has been found that cylindrical rollers fail to force the upper roofing sheet into the valleys or along the ridges which may be present in the lower roofing sheet due to the surface irregularities of the roof on which it is placed. Since the cylindrical roller is rigid from end to end, it cannot follow the roof contours or bumps and other irregularities which may be present along the width of the lap joint. Therefore, machines adapted to seal lap joints of heat-fusible roofing sheets which include a continuous rigid roller must be used on roofs which are substantially planar and have little or no bumps, valleys, ridges or other surface irregularities.

In forming the lap joints between heat-fusible or solvent-fused roofing sheets, not only must the upper sheet be placed into direct contact with the lower sheet, it must also be held in place for a sufficient time to allow the heat or solvent to fuse the sheets together and create a weather-tight seal therebetween. A single continuous roller may be ineffective in holding the upper roofing sheet into engagement with the lower sheet for a sufficient time period where the operator advances the roller too quickly along the roof, or in cooler weather when the roofing sheets are less flexible and tend to maintain their own shape instead of conforming to the slope of the sheet beneath.

SUMMARY OF THE INVENTION

It is therefore an object of this invention to provide a mechanized roofing apparatus operable to apply an even, continuous layer of solvent material between the overlapping edges of sheets of thermoplastic membrane material and to then apply pressure to the overlapping edge of the upper sheet so as to form a weather-tight lap joint.

The apparatus herein comprises a frame, a handle assembly mounted to the frame, drive means for advancing the frame along the overlapping edges of upper and lower roofing sheets, means for applying solvent material between the overlapping sheets and means for thereafter exerting uniform pressure on substantially the entire surface area of the overlapping edge of the upper roofing sheet so as to force the upper sheet against the lower sheet and into any valleys, ridges or bumps which may be present on the lower sheet due to surface irregularities of the roof.

The drive assembly includes a motor mounted to the frame, a drive roller mounted for rotation to the base of the frame and operatively connected to the motor, an idler roller rotatably mounted to the frame and spaced from the drive roller, and an endless belt extending between the drive roller and idler roller having a lower run adapted to contact the roof. Preferably, the motor is variable speed and drives the drive roller to in turn move the endless belt between the idler roller and drive roller for advancing the frame along the roof.

The means for applying pressure to the overlapping sheets includes a plurality of the spring-biased casters extending between the frame and the lower run of the endless belt. Preferably, each caster comprises a shaft having a roller at one end which contacts the belt. A sleeve, mounted to the frame, is fitted over the other end of the shaft with a compression spring being disposed along the caster shaft between the sleeve and the roller. The casters are mounted to the frame in an array of columns and rows in which a space approximately equal to the width of a caster is provided between adjacent casters in each column and a space approximately equal to the length or diameter of a caster is provided between adjacent casters in each row. Substantially no spaces are provided between the casters in adjacent columns and rows. With this arrangement, pressure is applied over the entire surface area of the overlapping edge of the upper roofing sheet by the casters; and, any given point on the edge of the upper roofing sheet is rolled over by each caster in one of the columns as the apparatus advances along the roof. The compression springs force the casters against the lower run of the belt, and, together with the weight of the frame, urge the belt against the upper sheet to effect a seal with the lower sheet.

The solvent applying means comprises a container mounted to the handle assembly, a solvent delivery line connected to the container, means disposed along the solvent delivery line for controlling and metering the flow of solvent material and means connected at the terminal end of the solvent delivery line for spreading the solvent material between the edges of the overlapping roofing sheets. Preferably, the flow control means connected to the solvent delivery line includes a needle valve, which is adapted to meter or vary the flow of solvent to the terminal end of the delivery line. In addition, the flow control means includes an on/off valve, such as a solenoid valve, which is connected to the delivery line and operable to start and stop the flow of solvent therethrough. The terminal end of the solvent delivery line is disposed at a right angle to the lap joint formed by the roofing sheets and is adapted to fit between the sheets so as to raise the overlapping sheet from the one beneath. Preferably, the terminal end is formed with a plurality of spaced openings through which the solvent material is allowed to flow. The solvent material is spread along the width of the lap joint by a section of absorbent material such as felt which is fitted over the terminal end of the solvent delivery line and becomes saturated with solvent material. The felt acts as a wick for the solvent and spreads it evenly along the edges of both the upper and lower roofing sheets within the lap joint. A flexible brush is mounted above the wick and urges the bottom of the upper sheet against the wick to ensure that it is saturated with solvent.

In applications where a single-ply membrane of thermoplastic material is recommended for use, the apparatus of this invention provides a dependable and efficient means of permanently sealing the overlapping edges of the roofing sheets. As described above, the most common method of applying solvent material between the overlapping edges of thermoplastic roofing sheets is for a workman to lift the upper or overlapping roofing sheet and hand-brush the solvent onto the sheet beneath. A sandbag is then placed over the upper sheet to provide sufficient weight to obtain a seal between the overlapping sheets. This procedure is not only time consuming and labor intensive but can result in uneven application of solvent material and insufficient and/or nonuniform pressure on the upper roofing sheet, resulting in a seal which may leak. The mechanized roofing apparatus of this invention is operable to automatically apply an even coating of solvent on both the upper and lower sheets and to apply uniform pressure on the entire overlapping edge of the upper roofing sheet to effect a seal with the roofing sheet beneath.

DESCRIPTION OF THE DRAWINGS

The structure, operation and advantages of this invention will be further apparent upon consideration of the following description taken in conjunction with the accompanying drawings wherein.

DETAILED DESCRIPTION OF THE INVENTION

Figure 1:
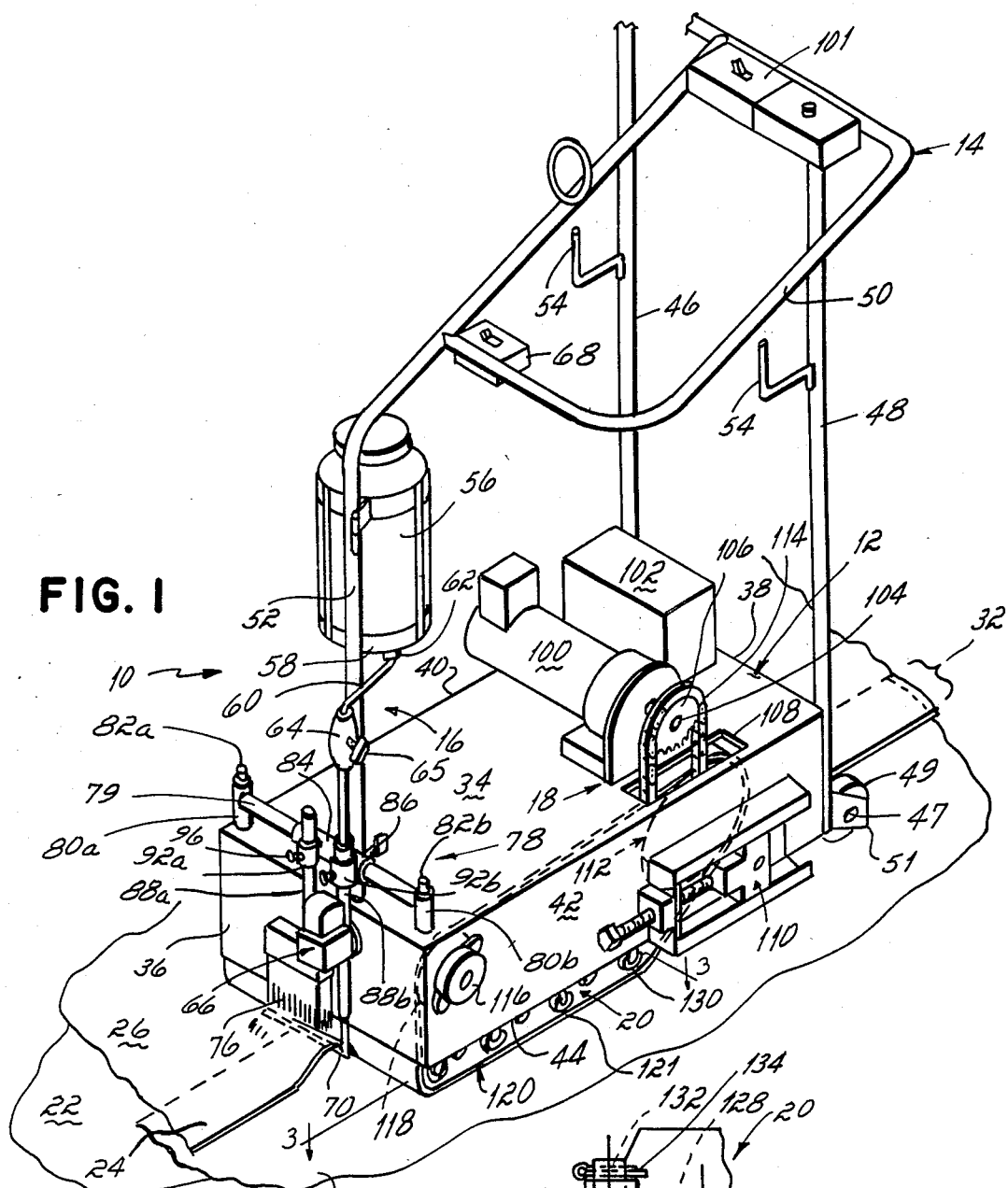
FIG. 1 is an isometric view of the roofing apparatus of this invention.

The roofing apparatus 10 of this invention includes a frame 12, a handle assembly 14 mounted to the frame 12, a solvent delivery assembly 16, a drive assembly 18 for moving the frame 12 along the roof 22, and a caster assembly 20. The roofing apparatus 10 is adapted to lift the overlapping edge 24 of an upper sheet 26 of single-ply thermoplastic roofing material above the roofing sheet 28 beneath, apply a uniform layer 30 of solvent material between sheets 26, 28 and then press together and seal the lap joint 32 formed by the overlapping edges of sheets 26, 28 as the frame 12 is advanced along the roof 22.

The frame 12 is rectangular in shape and comprises a top 34, front and rear ends 36, 38, and opposed sides 40, 42, all connected together. The bottom 44 of the frame 12 is open for purposes to become apparent below. Preferably, all elements of the frame 12 are formed of steel plates or similar rigid material.

The handle assembly 14 comprises a pair of spaced rear legs 46, 48, which are mounted to the rear end 38 of the frame 12 by welding or other suitable means. A pair of transport wheels 49 connected by an axle 47 are mounted to a flange 51 welded on the base of each of the rear legs 46, 48. The wheels 49 help stabilize the frame 12, and axle 47 is useful as a hand grip for positioning and transporting the apparatus 10. A cross brace 50 is mounted to the upper end of legs 46, 48 and extends in a U-shape toward the front end 36 of frame 12. An L-shaped brace 52 is mounted at one end to the top 34 near the front of frame 12 and extends upwardly to mount to the U-shaped cross brace 50. As discussed below, controls for the solvent delivery assembly 16 and drive assembly 18 are mounted for easy access to the handle assembly 14. In addition, a hook 54 is mounted midway along each of the rear legs 46, 48 of the handle assembly 14, which support a portion of the solvent delivery assembly 16 when the roofing apparatus 10 is transported, as described below.

The solvent delivery assembly 16 is adapted to apply a uniform solvent layer 30 between the overlapping edges of roofing sheets 28, 30 to form a sealed lap joint 32. Solvent delivery assembly 16 includes a container 56 which is supported by a basket or holder 58 pivotally mounted to the L-shaped brace 52 of handle assembly 14. A solvent delivery line 60 is connected by a fitting 62 to the base of container 56, and extends downwardly to the front of frame 12. Flow of solvent material through the delivery line 60 is metered by a needle valve 64 and shut on and off by a solenoid valve 66, both of which are disposed along the delivery line 60. As shown in the Figures, the needle valve 64 is adjustable to vary the flow of solvent through line 60 by rotating a wing nut 65, and the solenoid valve 66 is operated by a switch 68 mounted to the cross brace 50 of handle assembly 14.

The solvent material flows by gravity through the delivery line 60 from the container 56 to its terminal end 70. The terminal end 70 is bent at a right angle to the lap joint 32 formed by roofing sheets 26, 28 and is formed with a plurality of spaced radial openings 72 along its length which permit flow of solvent therethrough. A section of absorbent material such as felt forming a wick 74 is fitted over the terminal end 70 and becomes saturated with the solvent flowing through the spaced openings 72. The terminal end 70 and wick 74 are positioned to extend beneath the overlapping edge of the upper roofing sheet 26, lifting it upwardly a small distance, to deposit solvent on the bottom of sheet 26 and on top of the edge of the roofing sheet 28 beneath. Solvent flowing through the opening 72 along the length of the terminal end 70 of delivery line 60 evenly saturates the wick 74 so that a continuous layer 30 of solvent material is distributed between the overlapping sheets 26, 28. Unlike the manual application of solvent, the wick 74 coats the overlapping edges of both the upper and lower roofing sheets 26, 28 to achieve a better seal therebetween. A flexible brush 76 is disposed immediately behind the terminal end 70 of delivery line 60 and extends on top of the upper sheet 26 above the wick 74. As the upper roofing sheet 26 is lifted from the sheet 28 beneath by the terminal end 70 and wick 74 to apply the solvent, the brush 76 urges the upper sheet 26 into contact with the wick 74 to ensure that the solvent is deposited on the bottom of sheet 26.

The terminal end 70, wick 74 and brush 76 are mounted in position by an adjustable support brace 78. Support brace 78 includes a pipe 79 having vertical sleeves 80a,b mounted at each end which are adapted to fit over upstanding pegs 82a,b mounted on opposite sides of the frame top 34 near its front end 36. A horizontal sleeve 84 is slidable along the length of pipe 79 and is releasably secured in any position therealong by tightening a thumb screw 86. The brush 76 and terminal end 70 of delivery line 60 are mounted to one end of a pair of vertical braces 88a,b, which are connected at the other end to the sleeve 84 movable along pipe 79. If desired, the vertical braces 88a,b may be adjustably mounted to horizontal sleeve 84 to permit vertical movement of the brush 76 and wick 74 relative to the frame 12. This can be accomplished by mounting a pair of vertical sleeves 92a,b to the horizontal sleeve 84 and extending the vertical braces 88a,b therethrough, where they are secured in the desired position by set screws 96. The support brace 78 therefore permits both horizontal and vertical adjustment of the position of the brush 76, wick 74 and the terminal end 70 of delivery line 60 within the lap joint 32 formed by overlapping sheets 26, 28 to position them appropriately. This adjustment capability is advantageous in sealing lap joints 32 which are formed near a wall or other obstructions (not shown) on roof 22 where the frame 12 would interfere with the wall if the position of wick 74 and brush 76 could not be moved to one side of the frame 12 or the other. The entire support brace 78 may be removed from pegs 82a,b and placed on the hooks 54 mounted to the rear legs 46, 48 of handle assembly 14 for transport of apparatus 10.

The frame 12 is advanced along the roof 22 by drive assembly 18. The drive assembly 18 comprises a motor 100, preferably variable speed, which is controlled by a motor controller 102 mounted adjacent the motor 100 to the top 34 of frame 12. The drive shaft 104 of the motor 100 is provided with a sprocket 106 which extends above an opening 108 formed in the frame top 34. A pair of laterally adjustable rear bearings 110 are mounted to opposite frame sides 40, 42 near the rear end 38 of frame 12 and are adapted to rotatably mount a drive roller 112. The drive roller 112 is operatively connected to the motor 100 by a chain 114 which extends through the frame opening 108 to the motor sprocket 106. A pair of forward bearings 116 are mounted to the sides 40, 42 near the front end 36 of frame 12 which are adapted to rotatably mount an idler roller 118 to frame 12. Preferably, the idler roller 118 is smaller in diameter than drive roller 112 and is contained within the frame 12 as is the drive roller 12. Extending between the drive roller 112 and idler roller 118 is an endless belt 120, formed of elastomer or a similar resilient material, which has a lower run 121 which contacts the roof 22. The roofing apparatus 10 is advanced along roof 22 by flipping a switch 101 mounted to the handle assembly 14 which activates the motor 100 and causes the drive roller 112 to move the belt 120 between it and idler roller 118. Movement of the lower run 121 of belt 120 along the roof 22 propels apparatus 10.

Figure 2:
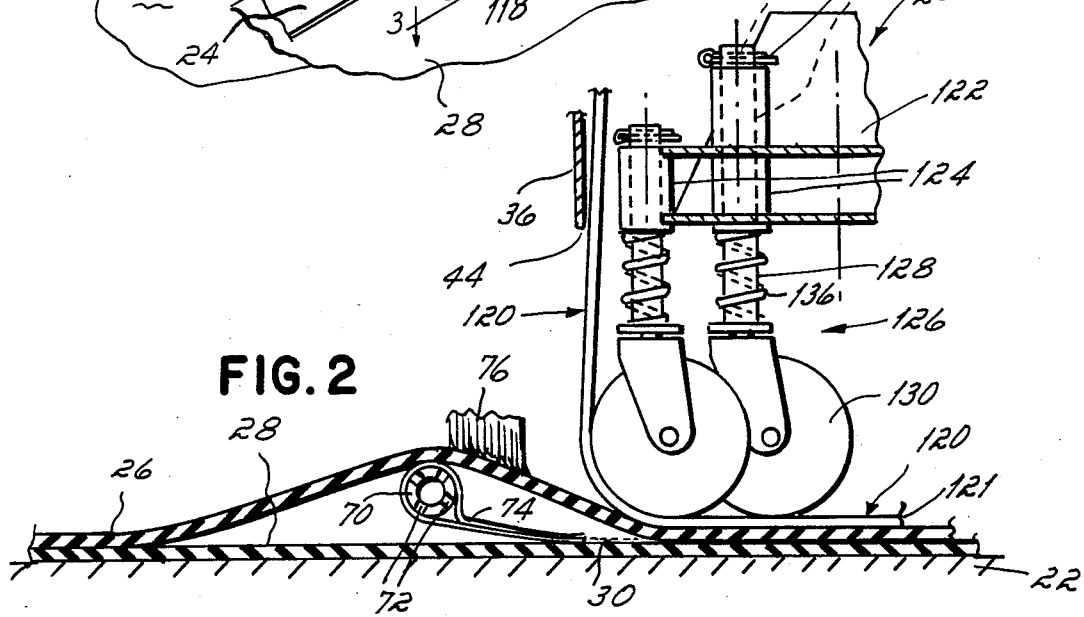
FIG. 2 is a view of the solvent application section and a partial cross-section of one embodiment of the caster assembly herein.
Figure 4:
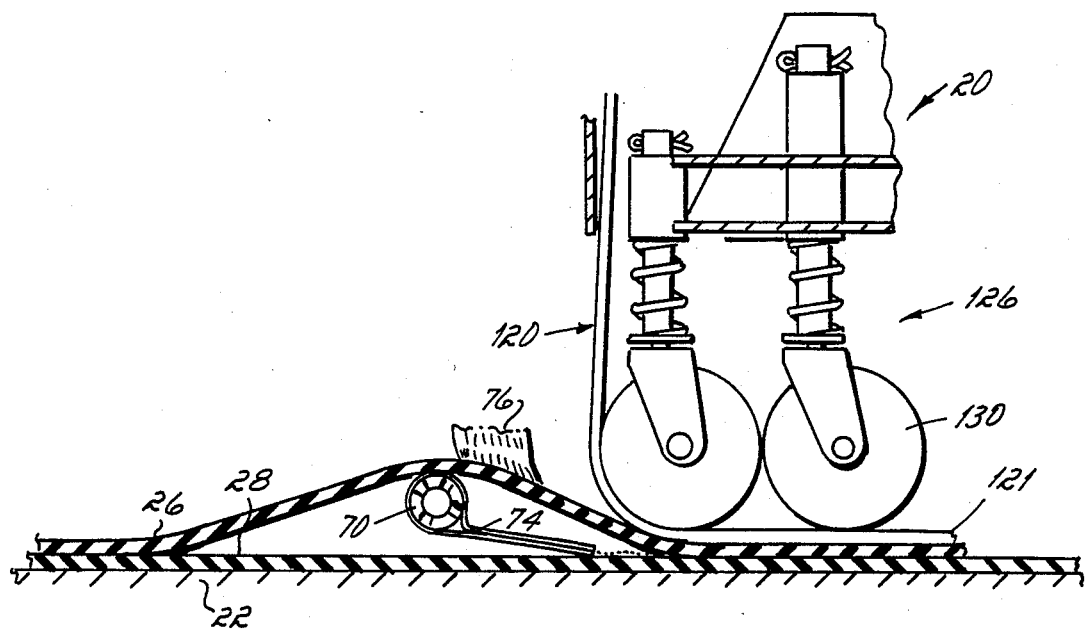
FIG. 4 is a side view of the alternative embodiment of the caster assembly shown in FIG. 3.

In the embodiments shown in FIGS. 2 and 4, the caster assembly 20 comprises a support tray 122 adapted to be inserted within the frame 12 through its open bottom 44 and then mounted to frame sides 40, 42. A plurality of sleeves 124 are mounted in an offset pattern to the base of the support tray 122 concentric with openings (not shown) formed therein. A like number of casters 126, each having a shaft 128 connected at one end to a roller 130, are adapted to mount to the sleeves 124. The shaft 128 of each caster is first inserted through the opening in tray 122 and then into a sleeve 124. The upper, free end of each shaft 128 is formed with an opening 132 which extends slightly beyond the sleeve 124 once the casters 12 are in place. A pin 134 is inserted through the shaft opening 132 which prevents the casters 126 from falling out of the sleeves 124. A compression spring 136 is disposed along each caster shaft 128 between the sleeves 124 and rollers 130. Once mounted to sleeves 124, the casters 126 extend downwardly so that the rollers 130 contact the upper surface of the lower run 121 of endless belt 120 as it moves along the roof 22.

Figure 3:
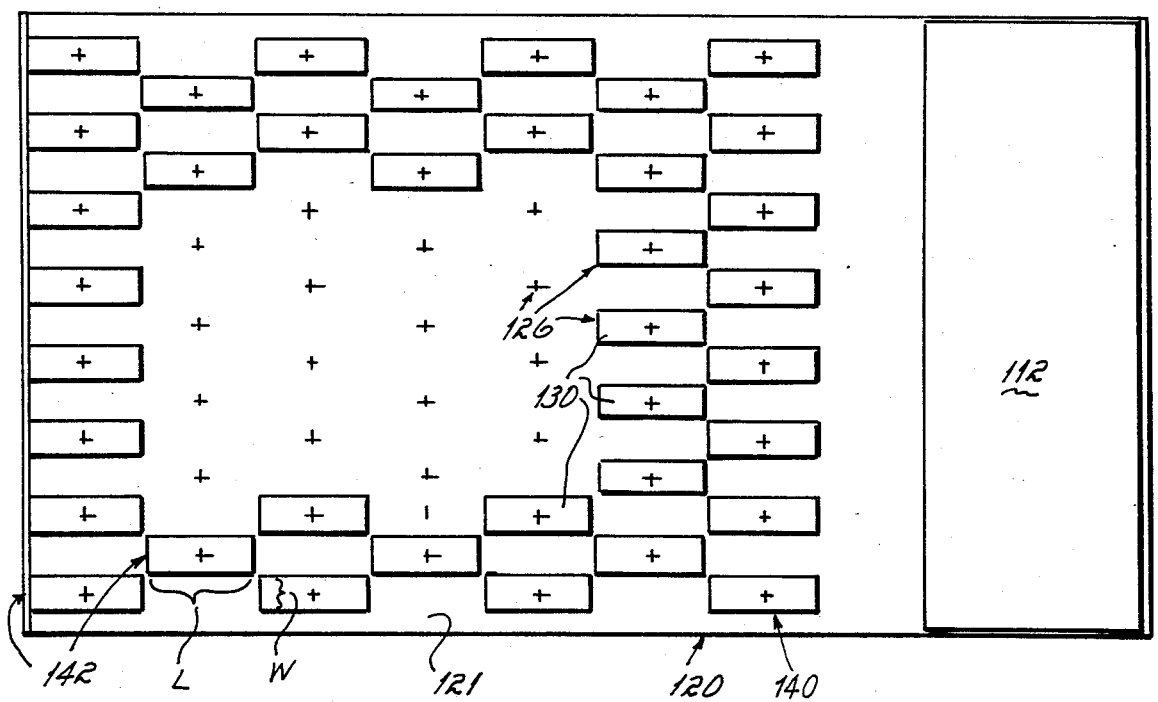
FIG. 3 is a partial cross-sectional view of an alternative embodiment of the caster assembly herein taken generally along line 3—3 of FIG. 1.

In the embodiment shown in FIGS. 3 and 4, fifty-three casters 126 are arranged in an array of seven columns 140 and fifteen rows 142 in which a space equal to the width W of a caster 126 is provided between adjacent casters 126 in each column 140 and a space equal to the length or diameter L of a caster 126 is provided between adjacent casters 126 in each row 142. Essentially no spaces are provided between the casters 126 in adjacent columns 140 and rows 142. Alternate columns 140 include seven and eight casters 126, respectively, and alternate rows 142 include three and four casters 126. As shown in FIGS. 3 and 4, the casters 126 in one column 140 do not overlap with those in an adjacent column 140, but are even or slightly spaced therefrom. In an alternative embodiment shown in FIG. 2, the casters 126 of successive columns 140 may overlap slightly. In both embodiments shown in FIGS. 2 and 4, the columns 140 and rows 142 of casters 126 are offset from one another, as shown in FIG. 3, due to the spacing of casters 26 in each column 140 and row 142. This assures that the entire surface of the lower run 121 of belt 120 is subjected to pressure as the frame 12 is advanced along the roof 22. Importantly, the compression spring 36 and the weight of frame 12 force each caster 126 downwardly against the lower run 121 of belt 120 which contacts the roofing sheets 26, 28. This is critical to achieving a weather-tight seal between the overlapping roofing sheets 26, 28 on roofs 22 having surface irregularities. If the frame 12 passes over a bump or valley in the roof 22, the row 142 of casters 126 passing directly over the bump will be deflected upwardly, and those rows 142 of casters 126 on either side of the bump will force the upper roofing sheet 26 downwardly against the lower sheet 28 so that no gap is created therebetween and a good seal is formed. A cylindrical roller contacting a bump is incapable of forcing the roofing sheet immediately adjacent the bump downwardly into contact with the sheet beneath. By providing independently movable spring-biased casters 126, the upper roofing sheet 26 is forced into the contours of the lower sheet 28 formed by bumps, valleys or ridges in the roof 22 so that good contact is made therebetween allowing the solvent to fuse the sheets 26, 28 together.

Not only is it important to ensure that the upper sheet 26 is forced into engagement with the lower sheet 28 even in the presence of ridges or valleys in the roof 22, but the two sheets 26, 28 must be held together for a sufficient period of time to allow the solvent material to fuse the sheets 26, 28 together. As is well known, the solvent material evaporates quickly, and a void can occur where the upper sheet 26 contacts the lower sheet 28 for a very short period of time and then lifts back upwardly allowing the solvent to evaporate. This is particularly a problem in colder weather where the roofing sheets 26, 28 tend to maintain their own shape and are not as flexible as in warmer weather. Another important aspect of the caster assembly 20 is that it is adapted to apply pressure against the roofing sheets 26, 28 for a much greater period of time than a single cylindrical roller used in typical prior art machines. The caster assembly 20 extends along the length of frame 12 and the lower run 121 of belt 120. Any given point on the roofing sheets 26, 28 is thus contacted or rolled over by each of the four casters 126 in one of the rows 142. As the frame 12 is advanced along the roof 22, four casters 126 of a given row 142 roll over a given point on roofing sheets 26, 28 and exert downward pressure on such point. A single cylindrical roller contacts any given point for a much shorter period of time.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teaching of the invention without departing from the essential scope thereof. Therefore, it is intended that the invention not be limited to the particular embodiment disclosed as the best mode contemplated for carrying out the invention, but that the invention will include all embodiments falling within the scope of the appended claims.

Wherefore I claim:

1. Apparatus for sealing the bottom surface of an edge of an upper sheet of roofing material to the underlying top surface of an edge of a lower sheet of roofing material, comprising:
   a frame having a leading end, a trailing end and opposed sides;
   drive means mounted upon said frame for moving said frame over the edges of the upper and lower sheets of roofing material, said drive means including an endless belt with a lower run having a length extending from said leading end toward said trailing end of said frame and a width extending between said opposed sides of said frame, said lower run of said endless belt contacting the edge of the upper sheet of roofing material;

means mounted to said leading end of said frame for applying solvent material upon the bottom surface of the edge of the upper sheet of roofing material and the top surface of the edge of the lower sheet of roofing material;

a plurality of casters mounted to said frame, each of said casters having an independently movable roller contacting said lower run of said endless belt, said casters being oriented in an array of spaced columns and spaced rows so that said columns extend along said length of said lower run of said endless belt and said rows extend along said width of said lower run of said endless belt, the space between said rows of casters being no more than about the width of one roller of a caster.

2. The apparatus of claim 1 in which said means for applying solvent material to the sheets of roofing material comprises:

a solvent container mounted to said frame;

a solvent delivery line having an inlet end and an outlet end, said inlet end being connected to said solvent container;

mounting means movably mounted to said leading end of said frame for supporting said outlet end of said solvent delivery line, said mounting means being movable along said leading end of said frame between said opposed sides;

flow control means connected to said solvent delivery line for turning on and off and for varying the flow rate of solvent material through said solvent delivery line;

spreading means mounted to said outlet end of said solvent delivery line for spreading solvent material upon the bottom surface of the edge of the upper sheet of roofing material and upon the top surface of the edge of the lower sheet of roofing material.

3. The apparatus of claim 2 further comprising means mounted to said frame substantially directly above said spreading means for urging the bottom surface of the edge of the upper sheet of roofing material against said spreading means to ensure the application of solvent material thereto.

* * * * *